United States Patent
Du

(10) Patent No.: US 10,345,929 B2
(45) Date of Patent: Jul. 9, 2019

(54) PRESSURE SENSITIVE STYLUS

(71) Applicant: SHENZHEN GOODIX TECHNOLOGY CO., LTD., Shenzhen, Guangdong (CN)

(72) Inventor: Canhong Du, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/812,354

(22) Filed: Nov. 14, 2017

(65) Prior Publication Data
US 2018/0088692 A1 Mar. 29, 2018

Related U.S. Application Data

(63) Continuation of application No. PCT/CN2016/100962, filed on Sep. 29, 2016.

(51) Int. Cl.
G06F 3/041 (2006.01)
G06F 3/0354 (2013.01)

(52) U.S. Cl.
CPC .................. G06F 3/03545 (2013.01)

(58) Field of Classification Search
CPC ............ G06F 3/03545–03546; G06F 2203/04101–04108; G06F 2203/04807–04808
See application file for complete search history.

(56) References Cited

U.S. PATENT DOCUMENTS 4,580,007 A 4/1986 Searby et al.
2003/0214490 A1* 11/2003 Cool ................... G06F 3/03545
345/179

(Continued)

FOREIGN PATENT DOCUMENTS

CN 203689461 U 7/2014
CN 104915027 A 9/2015
(Continued)

OTHER PUBLICATIONS

Extended European Search Report for European Patent Application No. 16900772 dated Jul. 31, 2018.
(Continued)

Primary Examiner — Sanghyuk Park
(74) Attorney, Agent, or Firm — Heslin Rothenberg Farley & Mesiti P.C.

(57) ABSTRACT

A stylus includes a touch element, a main control module configured to change thickness of handwriting on a touch screen, and a blocking element configured to limit a movement of the touch element. The touch element is elastically connected to the blocking element, and a head of the touch element forms a nib. The stylus further includes a magnetic component moving with a movement of the nib, and a detection module configured to detect a value of magnetic field intensity of the magnetic component. The magnetic component and the detection module are spaced from each other. The detection module is electrically connected to the main control module, and the value of writing force that the touch element is applied to the touch screen is in a preset proportion to the value of magnetic field intensity of the magnetic component detected by the detection module.

11 Claims, 4 Drawing Sheets

(56) References Cited

U.S. PATENT DOCUMENTS

| | | | |
|---|---|---|---|
| 2005/0140663 A1* | 6/2005 | Nakamura | G06F 1/1626 345/179 |
| 2013/0106802 A1 | 5/2013 | Liaw et al. | |
| 2014/0218338 A1 | 8/2014 | Kim | |
| 2015/0212605 A1* | 7/2015 | Lien | G06F 3/03545 345/179 |
| 2015/0378456 A1 | 12/2015 | Ho et al. | |

FOREIGN PATENT DOCUMENTS

| | | |
|---|---|---|
| CN | 205210836 U | 5/2016 |
| EP | 2743807 A | 6/2014 |
| EP | 2743807 A1 | 6/2014 |
| KR | 20110081780 A | 7/2011 |
| WO | 2009031758 A1 | 3/2009 |
| WO | 2011091752 A1 | 8/2011 |

OTHER PUBLICATIONS

European Patent Office Communication pursuant to Article 94(3) EPC for European Patent Application No. 16900772.1 dated Apr. 9, 2019.

\* cited by examiner

PRESSURE SENSITIVE STYLUS

CROSS-REFERENCE TO RELATED APPLICATIONS

This application is a continuation of International Patent Application No. PCT/CN2016/100962, with an international filing date of Sep. 29, 2016, which is hereby incorporated by reference herein, in its entirety.

TECHNICAL FIELD

This present disclosure relates to an electronic device, and in particular, to a stylus.

BACKGROUND

A touch mobile terminal is commonly equipped with a stylus as a tool, and a user can conveniently write on a display screen of the touch mobile terminal normally by using the stylus. Typically, there are two types of stylus, namely, a force stylus and a non-force stylus. A writing pressure sensing function is employed in the force stylus, so that when the user writes hard, handwriting on the screen automatically becomes thick, and when writing strength of the user becomes small, handwriting on the screen automatically becomes thin. In this way, writing experience of the user is closer to a writing effect on a sheet of paper, and the stylus gains wide popularity.

During implementation of the present disclosure, the inventor finds that, in the related art, as shown in FIG. 1, a nib 11, a pressure sensor 12, and a baffle board 13 of the force stylus 1 are in close contact. In addition, the nib 11 and a housing of the force stylus 1 are independent from each other, and the baffle board 13 is fixedly connected to the housing of the force stylus 1. Therefore, when a user writes with the stylus, a pressure applied to the nib 11 is transmitted to the pressure sensor 12, thereby changing an output signal of the pressure sensor 12. In addition, the signal of the pressure sensor 12 is sent to a main control module 14 by using a connection cable 15, and the main control module 14 may calculate, according to the output signal, a value of voltage output by the pressure sensor and correspondingly change thickness of handwriting of the nib 11. However, in an existing force stylus 1, because the pressure sensor of the force stylus 1 is generally formed by a resistance pressure strain gauge, internal assembly is complex, relatively high processing precision is required, and an outside environment easily imposes an impact. As a result, production costs of the pressure sensor and the stylus are high. Further, in the force stylus 1, the pressure sensor 12 and the main control module 14 of the force stylus 1 need to be connected to each other by using the connection cable 15. Consequently, an assembly process is complex, productivity is lowered, and it is easy to lower a product success rate during the complex assembly process.

Therefore, how to reduce the production costs of the stylus, simplify the assembly process, and improve the productivity and the success rate of the stylus without affecting user's experience, is a problem that needs to be resolved at present.

SUMMARY

To resolve the technical problem, some of embodiments of the present disclosure provide a stylus in which a pressure detection function is employed to make writing effects different according to different pressure values, so that an assembly process of the stylus is simplified and production costs of the stylus are reduced as well as user's experience is improved.

An embodiment of the present disclosure provides a stylus, including: a touch element disposed in a housing of the stylus and configured to write, a main control module configured to change thickness of handwriting on a touch screen according to a value of writing force that the touch element is applied to the touch screen, and a blocking element fixedly disposed in the housing of the stylus and configured to limit a movement of the touch element.

The touch element is elastically connected to the blocking element, and a head of the touch element is exposed outside the housing to form a nib of the stylus.

The stylus further includes: a magnetic component, disposed in the housing and fixed on the touch element, and moving with a movement of the nib, and a detection module disposed in the housing and configured to detect a value of magnetic field intensity of the magnetic component.

The magnetic component and the detection module are disposed opposite to and spaced from each other in the housing, the detection module is electrically connected to the main control module, and the value of writing force that the touch element is applied to the touch screen is in a preset proportion to the value of magnetic field intensity of the magnetic component detected by the detection module.

Compared with the background technology, in some of the embodiments of the present disclosure, the stylus includes the touch element, the main control module, the blocking element, the magnetic component, and the detection module. The touch element is blocked by the blocking element and is elastically connected to the blocking element, and the head of the touch element is exposed outside the housing to form the nib. The magnetic component is fixed on the touch element. And the magnetic component and the detection module are spaced from each other. Therefore, when the nib of the touch element is pressed, a distance between the magnetic component and the detection module keeps changing due to a condition in which the touch element is pressed, thereby changing the value of magnetic field intensity detected by the detection module. In addition, since the value of magnetic field intensity detected by the detection module is in a preset proportion to the value of writing force that the touch element is applied to the touch screen, the detection module may obtain the value of writing force that the touch element is applied to the touch screen according to the detected value of magnetic field intensity around the magnetic component and the preset proportion. In this way, the main control module may change the thickness of handwriting on the touch screen according to the value of writing force. That is, different writing effects are made according to different pressure values on the touch element without using a pressure sensor. Therefore, the assembly process of the stylus is simplified, production costs of the stylus are reduced, and a success rate of the stylus is improved as well as user's experience is improved.

Further, to meet design and assembly requirements during actual application, a first cavity configured to accommodate the main control module, the detection module, and the magnetic component, and a second cavity configured to accommodate the touch element are arranged in the housing. The first cavity and the second cavity are spaced from each other by the blocking element. A tail portion of the touch element passes through the blocking element to enter the first cavity in the housing, and is fixedly connected to the magnetic component. Inner space of the housing is divided into two cavities by the blocking element. The tail portion of the touch element passes through the blocking element extending from the second cavity to the first cavity, and is connected to the magnetic component, so that the detection module detects the value of magnetic field intensity of the magnetic component.

Further, the touch element includes a main body portion with a nib, and an elastic element that is connected between the main body portion and the blocking element. The main body portion is elastically connected to the blocking element by the elastic element. Because the main body portion in the touch element is elastically connected to the blocking element by the elastic element, via an elastic resilience of the elastic element, the elastic element is compressed because the main body portion of the touch element is pressed when the touch element writes on the touch screen, thereby enabling the tail portion of the touch element to drive the magnetic component to move towards the detection module. The distance between the magnetic component and the detection module is changed, so that the value of magnetic field intensity detected by the detection module is changed.

Further, to meet design and assembly requirements during actual application, the elastic element and the main body portion are integrally formed or detachably connected.

Further, the elastic element is an elastic gasket. The elastic gasket has desirable elastic resilience performance, a simple structure, and wide sources. Therefore, it can be ensured that the elastic element has excellent elasticity performance, the main body portion and the elastic element can be assembled and connected conveniently, and the production costs can be reduced.

Further, the main control module is a main control board, and the detection module is fixed on and electrically connected to the main control board. By directly fixing the detection module on the main control board, communications between the detection module and the main control module are performed without connecting the detection module and the main control module by using a connection cable. Therefore, an assembly process is simplified, and productivity and a success rate is improved. Moreover, intensity of connection between the detection module and the main control board may be effectively improved in a direct fixing manner, to avoid that a circuit between the detection module and the main control board is in poor contact after being used for a long time.

In addition, the detection module includes a sensor configured to detect the value of magnetic field intensity of the magnetic component, and a signal processing sub-module electrically connected to the sensor and configured to calculate, according to the value of magnetic field intensity detected by the sensor, a value of pressure that the touch element is applied to the touch-screen. The detection module includes the sensor and the signal processing sub-module. The value of magnetic field intensity of the magnetic component may be detected by the sensor, and the signal processing sub-module may calculate the value of pressure that the touch element is applied to the touch screen according to the value of magnetic field intensity detected by the sensor, so that the main control module accurately changes thickness of handwriting on the touch screen according to the value of pressure calculated by the signal processing sub-module.

In addition, the signal processing sub-module includes a signal amplifying circuit configured to amplify a signal output by the sensor, an analog-digital converter connected to the signal amplifying circuit and configured to convert an analog signal output by the signal amplifying circuit to a digital signal, and a microprocessor connected to the analog-digital converter and configured to calculate, according to the digital signal output by the analog-digital converter, the value of pressure that the touch element is applied to the touch screen. The signal processing sub-module includes the signal amplifying circuit, the analog-digital converter, and the microprocessor. The signal amplifying circuit is connected to the sensor, and the analog-digital converter is connected between the signal amplifying circuit and the microprocessor. Therefore, during actual work, the sensor may output a corresponding analog signal to the signal processing sub-module according to the detected value of magnetic field intensity of the magnetic component. After the signal processing sub-module receives the analog signal, the signal amplifying circuit may first amplify the analog signal and output an amplified analog signal to the analog-digital converter, and the analog-digital converter subsequently converts the analog signal to a digital signal. At last, the microprocessor receiving the digital signal calculates a corresponding pressure value, so that the main control module may precisely change the thickness of handwriting on the touch screen according to the pressure value.

In addition, the sensor is a Hall sensor. The Hall sensor can provide high sensitivity and can output a corresponding signal according to a change of the detected magnetic field intensity, so that it can be ensured that the sensor can accurately convert the change of the magnetic field intensity caused by the magnetic component to a corresponding signal, and output the signal to the signal processing sub-module. In this way, the main control module precisely controls the thickness of handwriting on the touch screen subsequently.

In addition, the magnetic component is a permanent magnet. The permanent magnet not only can permanently generate a magnetic field, but also has wide sources and may adapt to different environments without being damaged easily. Therefore, use reliability of the stylus is ensured, as well as production costs of the stylus are reduced.

In addition, to prevent the stylus from having a power shortage after being used for a long time and to facilitate user's operations, the stylus further includes a power supply that is detachably installed in the housing, and the power supply is electrically connected to the main control module and the detection module respectively.

BRIEF DESCRIPTION OF THE DRAWINGS

One or more embodiments make exemplary description by using corresponding figures in accompanying drawings and the exemplary description does not limit the embodiments. Components having a same reference number in the accompanying drawings are indicated as similar components, and unless being particularly declared, a ratio is not limited by the figures in the accompanying drawings.

DETAILED DESCRIPTION

To make the objectives, technical solutions, and advantages of the present disclosure clearer and more comprehensible, the following further describes some of embodiments of the present disclosure in detail with reference to the accompanying drawings and embodiments. It should be understood that the specific embodiments described herein are merely used to explain the present disclosure but not intended to limit the present disclosure.

Figure 1:
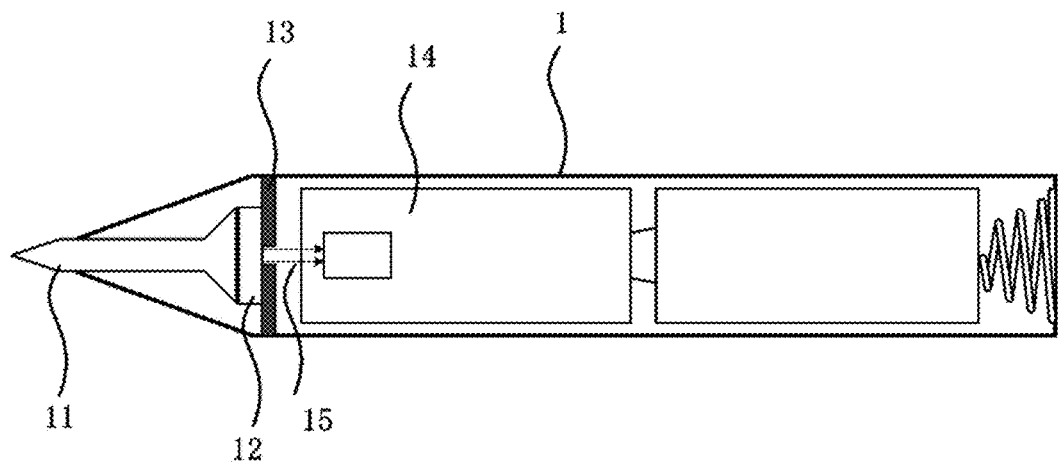
FIG. 1 is a structural schematic diagram of a stylus in the background technology according to the present disclosure.
Figure 2:
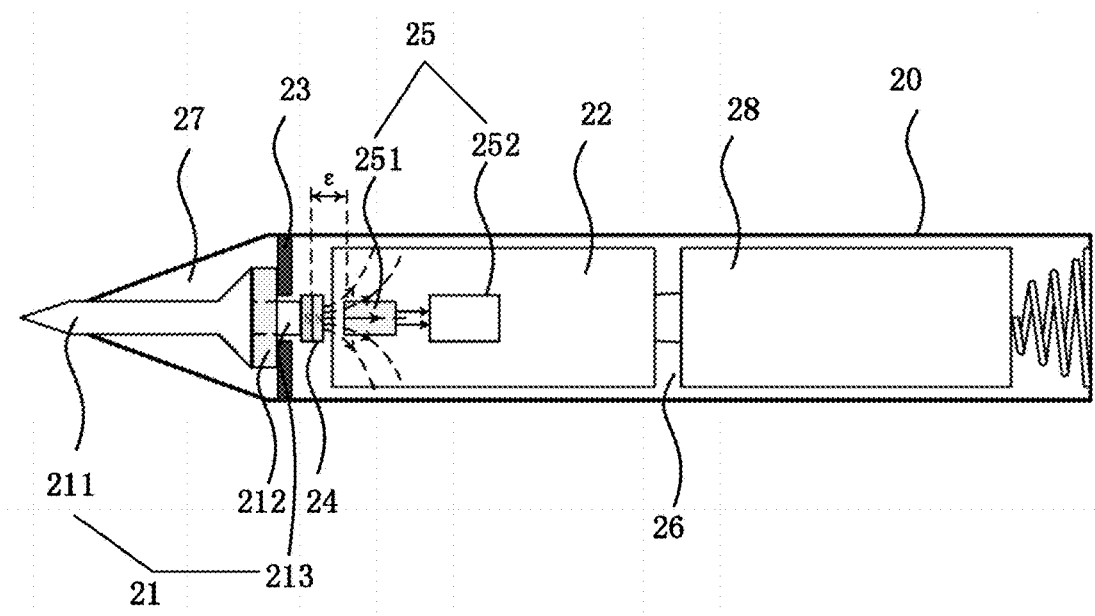
FIG. 2 is a structural schematic diagram of a stylus according to a first embodiment of the present disclosure.
Figure 3:
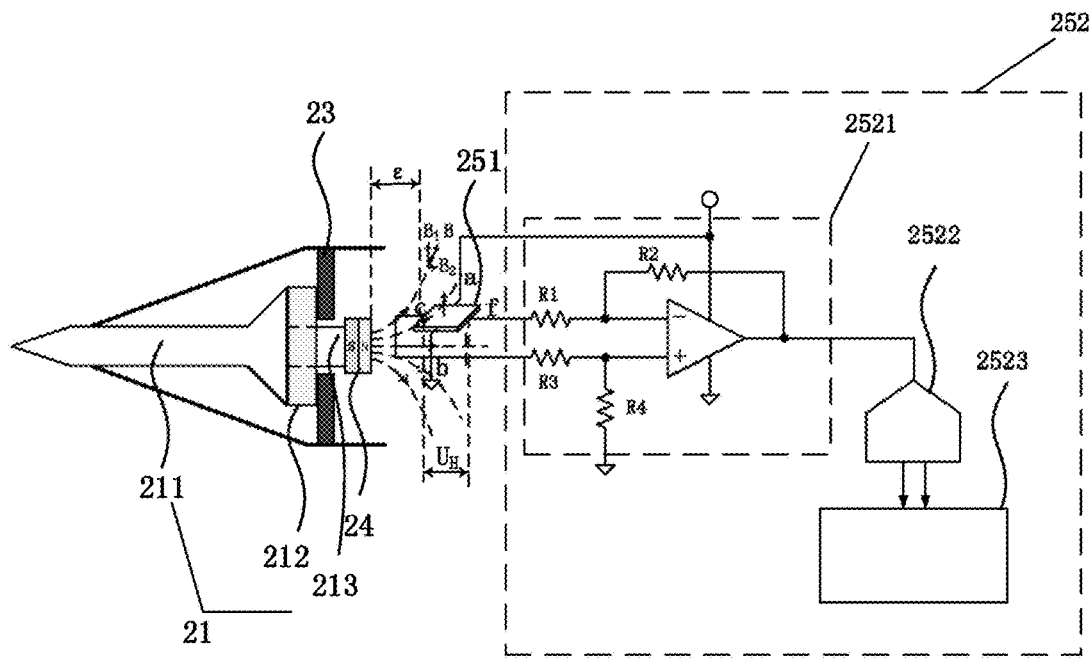
FIG. 3 is a block diagram of a circuit module of the stylus according to the first embodiment of the present disclosure.

A first embodiment of the present disclosure provides a stylus. As shown in FIG. 2 and FIG. 3, the stylus includes a touch element 21, a main control module 22, a blocking element 23, a magnetic component 24, and a detection module 25 that are disposed in a housing 20 of the stylus. The touch element 21 is configured to write on a touch screen by a user and is elastically connected to the blocking element 23, and a head of the touch element 21 is exposed outside the housing 20 to form a nib of the stylus. Correspondingly, the main control module 22 is configured to change thickness of handwriting on the touch screen according to a value of writing force that the touch element 21 is applied to the touch screen. The blocking element 23 is fixedly disposed in the housing 20 of the stylus and is configured to limit a movement of the touch element 21.

In addition, during actual assembly, as shown in FIG. 2 and FIG. 3, the magnetic component 24 is fixed on the touch element 21 and moves with a movement of the nib. The detection module 25 and the magnetic component 24 are spaced from each other, and the detection module 25 is electrically connected to the main control module 22. The value of writing force that the touch element 21 is applied to the touch screen is in a preset proportion to a value of magnetic field intensity of the magnetic component 24 detected by the detection module 25. In this embodiment, preferably, for the convenience of detecting the magnetic component 24 by the detection module 25, the detection module 25 and the magnetic component 24 are disposed in the housing 20, and opposite to each other.

Additionally, it should be further noted that the main control module 22 is electrically connected to the detection module 25. To ensure normal operation of the stylus, the stylus further includes a power supply 28 detachably installed in the housing 20. After being installed in the housing 20, the power supply 28 is electrically connected to the main control module 22 and the detection module 25 separately.

It can be learned from the above, the stylus includes the touch element 21, the main control module 22, the blocking element 23, the magnetic component 24, and the detection module 25. The touch element 21 is blocked by the blocking element 23 and is elastically connected to the blocking element 23, and the head of the touch element 21 is exposed outside the housing 20 to form the nib. The magnetic component 24 is fixed on the touch element 21. And the magnetic component 24 and the detection module 25 are spaced from each other. Therefore, when the nib of the touch element 21 is pressed, a distance between the magnetic component 24 and the detection module 25 keeps changing due to a condition in which the touch element 21 is pressed, thereby changing the value of magnetic field intensity detected by the detection module 25. In addition, since the value of magnetic field intensity detected by the detection module 25 is in a preset proportion to the value of writing force that the touch element 21 is applied to the touch screen, the main control module 22 may obtain the value of writing force that the touch element 21 is applied to the touch screen according to the detected value of magnetic field intensity around the magnetic component 24 and the preset proportion. In this way, the main control module 22 may change the thickness of handwriting on the touch screen according to the value of writing force. That is, different writing effects are output according to a pressure on the touch element 21 without using a pressure sensor. Assembly of the touch element 21, the main control module 22, the blocking element 23, the magnetic component 24, and the detection module 25 is relatively simple. In addition, the magnetic component 24 has wide sources, may avoid impact from the outside environment, and may be used for a long time without being damaged. Therefore, the assembly process of the stylus is simplified, production costs of the stylus are reduced, and a success rate of the stylus is improved as well as user's experience is improved.

Specifically, in this embodiment, to meet design and assembly requirements during actual application, preferably, a first cavity 26 and a second cavity 27 are arranged in the housing 20 of the stylus. The first cavity 26 is configured to accommodate the main control module 22, the detection module 25, and the magnetic component 24, and the second cavity 27 is configured to accommodate the touch element 21. The first cavity 26 and the second cavity 27 are spaced from each other by the blocking element 23. In addition, the touch element 21 mainly includes a main body portion 211 with a nib, an elastic element 212 that is connected between the main body portion 211 and the blocking element 23, and a tail portion 213. The tail portion 213 of the touch element 21 passes through the blocking element 23 to enter the first cavity 26 in the housing 20, and is fixedly connected to the magnetic component 24. Inner space of the housing 20 is divided into two cavity bodies by the blocking element 23. The tail portion 213 of the touch element 21 passes through the blocking element 23 extending from the second cavity 27 to the first cavity 26, and is connected to the magnetic component 24, so that the detection module 25 detects the value of magnetic field intensity of the magnetic component 24. It should be noted that, in this embodiment, to facilitate assembly during actual application, the power supply 28 is located in the first cavity 26.

In addition, in this embodiment, as shown in FIG. 2, the main body portion 211 mentioned above is elastically connected to the blocking element 23 by the elastic element 212. Moreover, the elastic element 212 of the touch element 21 is detachably connected to the main body portion 211, and the tail portion 213 of the touch element 21 is connected to the magnetic component 24.

It can be learned that, due to an elastic resilience of the elastic element 212, the elastic element 212 is compressed because the main body portion 211 of the touch element is pressed when the touch element 21 writes on the touch screen, thereby enabling the tail portion 213 of the touch element 21 to drive the magnetic component 24 to move towards the detection module 25, so as to generate a corresponding displacement ε. The distance between the magnetic component 24 and the detection module 25 is changed, so that the value of magnetic field intensity detected by a sensor 251 is changed.

In addition, in this embodiment, preferably, the elastic element 212 may be an elastic gasket. The elastic gasket has desirable elastic resilience performance, a simple structure, and wide sources. Therefore, it is ensured that the elastic element 212 has excellent elastic resilience performance, the main body portion 211 and the elastic element 212 can be assembled and connected conveniently, and production costs can be reduced. It should be noted that, in this embodiment, the elastic element 212 is a metal gasket. However, during actual application, the elastic element 212 may further be an elastic gasket of another type such as a spring, and no further description is provided herein. In addition, the elastic element 212 and the main body portion 211 may alternatively be integrally formed. Whether the elastic element 212 and the main body portion 211 are integrally formed or detachably connected is not specifically limited or described in this embodiment.

In addition, in this embodiment, as shown in FIG. 2 and FIG. 3, the detection module 25 mentioned above may include the sensor 251 and a signal processing sub-module 252 electrically connected to the sensor 251. Correspondingly, the signal processing sub-module 252 includes a signal amplifying circuit 2521, an analog-digital converter 2522, and a microprocessor 2523. The signal amplifying circuit 2521 is connected to the sensor 251, and the analog-digital converter 2522 is connected between the signal amplifying circuit 2521 and the microprocessor 2523. The sensor 251 of the detection module 25 may be configured to detect the value of magnetic field intensity of the magnetic component 24, and the signal processing sub-module 252 may be configured to calculate the value of pressure that the touch element 21 is applied to the touch screen according to the value of magnetic field intensity detected by the sensor 251. In addition, the signal amplifying circuit 2521 of the signal processing sub-module 252 is configured to amplify a signal output by the sensor 251, the analog-digital converter 2522 is configured to convert an analog signal output by the signal amplifying circuit 2521 to a digital signal, and the microprocessor 2523 may be configured to calculate the value of pressure that the touch element 21 is applied to the touch screen according to the digital signal output by the analog-digital converter 2522.

It is easy to find that, during actual work, the sensor 251 may send the corresponding signal, that is, the analog signal, to the signal processing sub-module 252 according to the detected value of magnetic field intensity of the magnetic component 24. After the signal processing sub-module 252 receives the analog signal, the signal amplifying circuit 2521 may first amplify the analog signal that is detected and output by the sensor 251, and the analog-digital converter 2522 subsequently converts the analog signal to the digital signal. At last, the microprocessor 2523 receiving the digital signal calculates a corresponding pressure value, so that the main control module 22 may precisely change thickness of handwriting on the touch screen according to the pressure value.

In addition, it should be noted that, in this embodiment, preferably, the sensor 251 is a Hall sensor. The Hall sensor can provide relatively high sensitivity and can output a corresponding signal according to a change of the detected magnetic field intensity, so that it can be ensured that the sensor 251 can accurately convert the change of the magnetic field intensity caused by the magnetic component 24 to a corresponding signal, and output the signal to the signal processing sub-module 252. In this way, the main control module 22 precisely controls the thickness of handwriting on the touch screen subsequently.

Correspondingly, in this embodiment, preferably, the magnetic component 24 mentioned above is a permanent magnet. The permanent magnet not only can permanently generate a magnetic field, but also has wide sources and may adapt to different environments without being damaged easily. Therefore, use reliability of the stylus is ensured, as well as production costs of the stylus are reduced.

Figure 4:
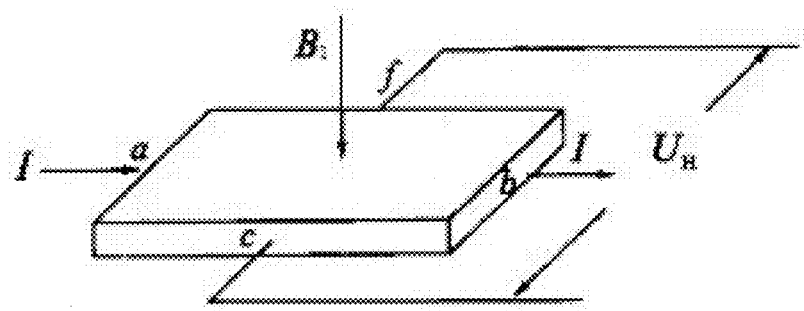
FIG. 4 is a diagram of working principle of a sensor according to the first embodiment of the present disclosure.
Figure 5:
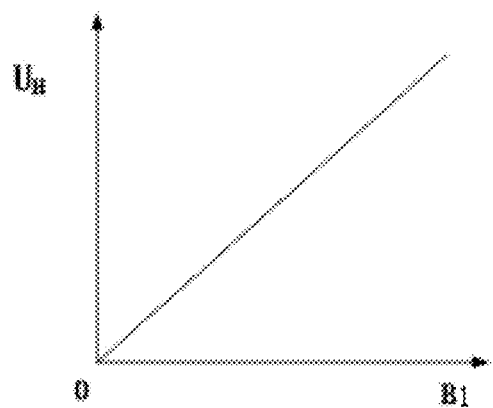
FIG. 5 is a diagram of a proportion relationship between values of magnetic field intensity detected by the sensor and inducted voltage values of a sensor according to the first embodiment of the present disclosure.
Figure 6:
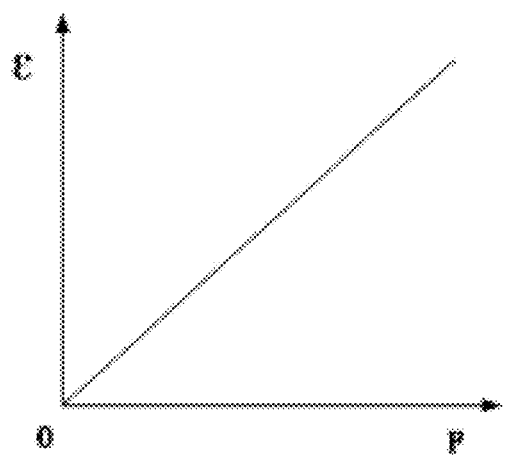
FIG. 6 is a diagram of a proportion relationship between pressure values on a main body portion and displacement values of the main body portion according to the first embodiment of the present disclosure.
Figure 7:
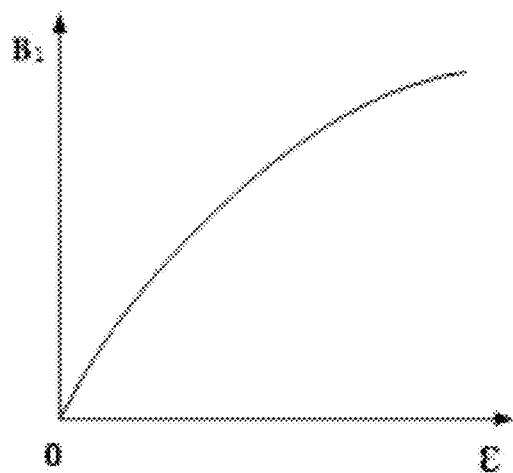
FIG. 7 is a diagram of a proportion relationship between displacement values of the main body portion and values of magnetic field intensity detected by a sensor according to the first embodiment of the present disclosure.
Figure 8:
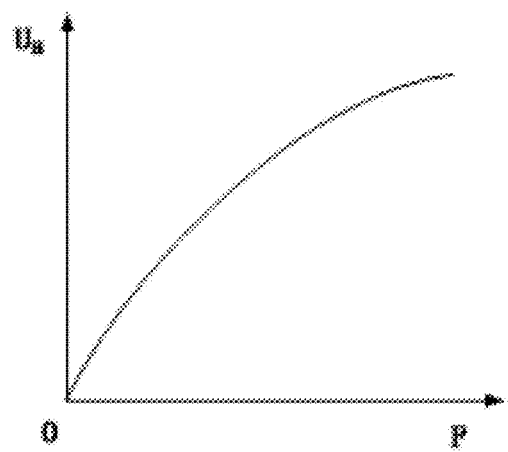
FIG. 8 is a diagram of a proportion relationship between pressure values on the main body portion and inducted voltage values of a sensor according to the first embodiment of the present disclosure.

In addition, it should be noted that, as shown in FIG. 3 and FIG. 4, when the magnetic component 24 is a permanent magnet, a space magnetic field generated by the permanent magnet is non-uniform. A non-uniform magnetic field B may be orthogonally decomposed into a magnetic field $B_1$ and a magnetic field $B_2$, $B_1$ is perpendicular to a sensing surface of the Hall sensor, and $B_2$ is parallel to the sensing surface of the Hall sensor. When a drive current I flows in at an end a and flows out at an end b, due to Lorentz force, the magnetic field $B_1$ may cause an electron flowing through the end a and the end b to deviate, leading to electric charge accumulation at an end c and an end f, thereby generating an inducted voltage $U_H$. As shown in FIG. 5, the inducted voltage $U_H$ is in direct proportion to the magnetic field $B_1$. When the touch element 21 is pressed during writing on the touch screen, as shown in FIG. 6, a proportion relationship between a value of pressure that is applied to the main body portion 211 and a displacement ε of the main body portion 211 after being pressed (that is, a variation value of a distance between the magnetic component 24 and the detection module 25) is linear. Because the magnetic field generated by the magnetic component 24 is non-uniform, as shown in FIG. 7, a proportion relationship between values of magnetic field $B_1$ and the displacements ε is nonlinear. Therefore, it can be learned from FIG. 8, a proportion relationship between values of pressure that is applied to the main body portion 211 and inducted voltages $U_H$ output by the sensor 251 is also nonlinear. In this way, a current value of pressure F that is applied to the main body portion 211 may be learned via the voltage value $U_H$ detected by the Hall sensor.

In addition, it should be noted that, the inducted voltage value $U_H$ detected by the Hall sensor is generally several milli-volts (mV). Therefore, after the Hall sensor sends the inducted voltage $U_H$ in a form of an analog signal to the signal processing sub-module 252, an amplitude of the analog signal first needs to be amplified by using the signal amplifying circuit 2521 to improve precision of a measuring result. As shown in FIG. 3, resistors R1, R2, R3, and R4 of the signal amplifying circuit 2521 and an operational amplifier (not shown) form a differential amplifying circuit. To ensure levels of magnification, during actual setting, preferably, let R1=R3 and R2=R4. In this case, the levels of magnification of the differential amplifying circuit is R2/R1 and an amplified output voltage value is R2/R1*$U_H$. After the amplified output voltage is input to the analog-digital converter 2522 as an analog signal, the analog-digital converter 2522 may convert the analog signal to a corresponding digital signal and send the digital signal to the microprocessor 2523, so that the microprocessor 2523 calculates the value of pressure F that is applied to the main body portion 211 according to the digital signal (that is, the value of writing force that the touch element 21 is applied to the touch screen).

A second embodiment of this application provides a stylus. The second embodiment is substantially similar to the first embodiment, and a main difference is that: in this embodiment, the detection module 25 is directly fixed on and electrically connected to a main control board.

It can be learned from the above, by directly fixing the detection module 25 on the main control board, communications between the detection module 25 and the main control module 22 are performed without connecting the detection module 25 and the main control module 22 by using a connection cable. Therefore, an assembly process is simplified, and productivity and a success rate is improved. Moreover, intensity of connection between the detection module 25 and the main control board may be effectively improved in a direct fixing manner, to avoid that a circuit between the detection module 25 and the main control board is in poor contact after being used for a long time. In addition, it should be noted that, in this embodiment, preferably, the detection module 25 may be fixed on the main control board by using welding.

Finally, it should be noted that the foregoing embodiments are merely intended to describe the technical solutions of this application rather than limit this application. Although this application is described in detail with reference to the foregoing embodiments, persons of ordinary skill in the related art should understand that they may still make modifications to the technical solutions described in the foregoing embodiments, or make equivalent replacements to some technical features of the foregoing embodiments, without departing from the spirit and scope of the technical solutions of the embodiments of this application.

What is claimed is:

1. A stylus, comprising:
a touch element disposed in a housing of the stylus and configured to write, and a head of the touch element is exposed outside the housing to form a nib of the stylus;
a main control module configured to change thickness of handwriting on a touch screen according to a value of writing force that the touch element is applied to the touch screen;
a blocking element fixedly disposed in the housing of the stylus, and elastically connected to the touch element and configured to limit a movement of the touch element;
a magnetic component disposed in the housing and fixed on the touch element, and moving with the movement of the nib; and
a detection module disposed in the housing and spaced from the magnetic component, electrically connected to the main control module and configured to detect a value of magnetic field intensity of the magnetic component;
wherein the value of writing force that the touch element is applied to the touch screen is in a preset proportion to the value of magnetic field intensity of the magnetic component detected by the detection module;
wherein the detection module comprises a Hall sensor configured to detect the value of magnetic field intensity of the magnetic component.

2. The stylus according to claim 1, wherein a first cavity configured to accommodate the main control module, the detection module, and the magnetic component, and a second cavity configured to accommodate the touch element are arranged in the housing; and
the first cavity and the second cavity are spaced from each other by the blocking element.

3. The stylus according to claim 2, wherein a tail portion of the touch element passes through the blocking element to enter the first cavity in the housing, and is fixedly connected to the magnetic component.

4. The stylus according to claim 3, wherein the touch element comprises a main body portion with a nib, and an elastic element that is connected between the main body portion and the blocking element; and
the main body portion is elastically connected to the blocking element by the elastic element.

5. The stylus according to claim 4, wherein the elastic element and the main body portion are integrally formed or detachably connected.

6. The stylus according to claim 4, wherein the elastic element is an elastic gasket.

7. The stylus according to claim 1, wherein the main control module is a main control board, and the detection module is fixed on and electrically connected to the main control board.

8. The stylus according to claim 1, wherein the detection module further comprises a signal processing sub-module electrically connected to the Hall sensor and configured to calculate, according to the value of magnetic field intensity detected by the Hall sensor, a value of pressure that the touch element is applied to the touch screen.

9. The stylus according to claim 8, wherein the signal processing sub-module comprises a signal amplifying circuit configured to amplify a signal output by the Hall sensor, an analog-digital converter connected to the signal amplifying circuit and configured to convert an analog signal output by the signal amplifying circuit to a digital signal, and a microprocessor connected to the analog-digital converter and configured to calculate, according to the digital signal output by the analog-digital converter, the value of pressure that the touch element is applied to the touch screen.

10. The stylus according to claim 1, wherein the magnetic component comprises a permanent magnet.

11. The stylus according to claim 1, wherein the stylus further comprises a power supply detachably installed in the housing; and
the power supply is electrically connected to the main control module and the detection module, respectively.

* * * * *